United States Patent
Lukanc et al.

(10) Patent No.: US 9,882,746 B2
(45) Date of Patent: Jan. 30, 2018

(54) TIMING-CONTROLLER-CONTROLLED POWER MODES IN TOUCH-ENABLED SOURCE DRIVERS

(71) Applicant: SYNAPTICS INCORPORATED, San Jose, CA (US)

(72) Inventors: Jeffrey Lukanc, San Jose, CA (US); Shriram Kulkarni, San Jose, CA (US); Stephen L. Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/983,226

(22) Filed: Dec. 29, 2015

(65) Prior Publication Data

US 2017/0187551 A1    Jun. 29, 2017

(51) Int. Cl.
| | |
|---|---|
| *H03H 7/30* | (2006.01) |
| *H03H 7/40* | (2006.01) |
| *H03K 5/159* | (2006.01) |
| *H04L 25/03* | (2006.01) |
| *H04W 72/04* | (2009.01) |
| *H04W 52/02* | (2009.01) |

(52) U.S. Cl.
CPC ... *H04L 25/03019* (2013.01); *H04W 52/0235* (2013.01); *H04W 72/0413* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 8,374,532 | B2* | 2/2013 | Matsushita | G03G 15/161 399/127 |
| 8,610,650 | B2 | 12/2013 | Somerville | |
| 8,766,950 | B1 | 7/2014 | Morein et al. | |
| 8,970,537 | B1 | 3/2015 | Shepelev et al. | |
| 2012/0281027 | A1* | 11/2012 | Kim | G09G 3/3406 345/690 |
| 2013/0021306 | A1* | 1/2013 | Kuo | G09G 3/20 345/204 |
| 2014/0029699 | A1* | 1/2014 | Wu | H04L 25/12 375/316 |
| 2014/0118235 | A1* | 5/2014 | Hong | G09G 5/008 345/87 |
| 2014/0160097 | A1* | 6/2014 | Kang | G06F 3/0416 345/204 |
| 2014/0204049 | A1 | 7/2014 | Tsai et al. | |
| 2015/0091849 | A1 | 4/2015 | Ludden | |

(Continued)

*Primary Examiner* — Shuwang Liu
*Assistant Examiner* — Gina McKie
(74) *Attorney, Agent, or Firm* — Paradice and Li LLP

(57) ABSTRACT

This disclosure generally provides a processing system that includes a first controller coupled with a second controller via a first communication link. The first controller is configured to transmit display data and configuration data to the second controller via the first communication link. The second controller is configured to drive, using the display data, one or more coupled display electrodes for performing display updating. The second controller is further configured to operate one or more coupled sensor electrodes using the configuration data to acquire capacitive sensing data, and to transmit the capacitive sensing data to the first controller via the first communication link.

20 Claims, 4 Drawing Sheets

(56) References Cited

U.S. PATENT DOCUMENTS

2015/0154943 A1 6/2015 Lee et al.
2015/0187315 A1* 7/2015 Park .................... G09G 3/3685
                                                    345/99
2016/0335986 A1* 11/2016 Bae ........................ G09G 5/005

* cited by examiner

TIMING-CONTROLLER-CONTROLLED POWER MODES IN TOUCH-ENABLED SOURCE DRIVERS

BACKGROUND

Field

Embodiments of the present disclosure generally relate to electronic devices.

Background of the Disclosure

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE DISCLOSURE

One embodiment described herein includes a processing system for a display. The processing system includes at least one source driver configured to be coupled to a plurality of common electrodes of the display and configured to drive the plurality of common electrode for display updating. The processing system further includes a timing module coupled to the at least one source driver via a communication link. The timing module is further configured to receive, via the communication link, an uplink signal from the source driver that includes operating information about the source driver. The timing module is configured to determine an operating parameter for the source driver based on the received operating information of the source driver. The timing module is further configured to transmit, via the communication link, a display data signal to the at least one source driver for display updating. The display data signal includes the operating parameter for the source driver. The at least one source driver is configured to modify operations of the source driver based on the operating parameter in the display data signal that causes a reduction in power consumption by the source driver.

One embodiment described herein provides a display device. The display device includes a plurality of common electrodes and at least one source driver coupled to the plurality of common electrodes. The at least one source driver is configured to drive the plurality of common electrode for display updating. The display device further includes a timing module coupled to the at least one source driver via a communication link. The timing module is configured to receive, via the communication link, an uplink signal from the source driver with operating information about the source driver. The timing module is further configured to determine an operating parameter for the source driver based on the received operating information of the source driver. The timing module is configured to transmit, via the communication link, a display data signal to the at least one source driver for display updating. The display data signal includes the operating parameter for the source driver. The at least one source driver is configured to change operations based on the operating parameter in the display data signal that causes a reduction in power consumption by the source driver.

Another embodiment described herein provides a processing system for updating a display. The processing system includes at least one source driver configured to drive a plurality of common electrodes of the display. The at least one source driver is configured to receive a signal containing display data for display updating via a communication link with an external controller. The at least one source driver is configured to change operations of the source driver based on an operating parameter contained in the signal received from the external controller. The change in operations causes a reduction in power consumption by the source driver.

Yet another embodiment described herein includes a processing system for updating a display. The processing system includes a timing module configured to be coupled to a source driver via a communication link. The timing module is configured to receive, via the communication link, an uplink signal from the source driver with operating information of the source driver. The timing module is configured to transmit, via the communication link, a display data signal to the source driver containing an operating parameter that causes a reduction in power consumption by the source driver. The display data signal provided to the source driver is at least in part generated based on the received operating information.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
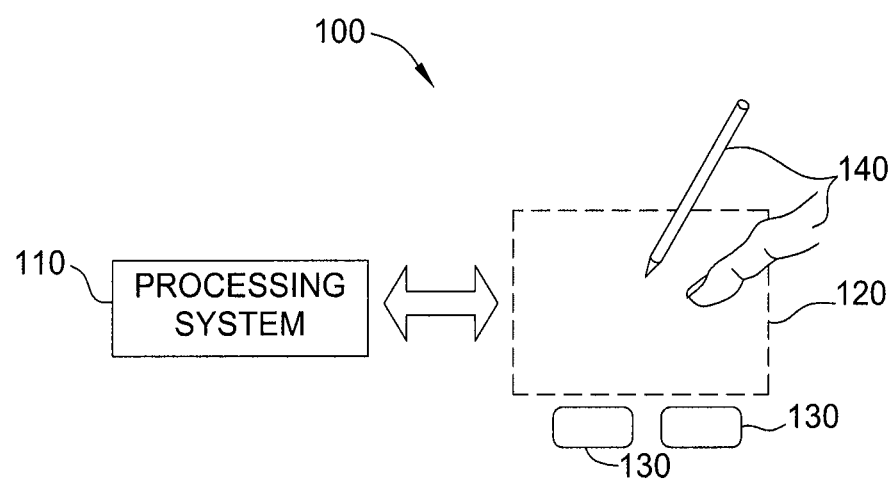
FIG. 1 is a block diagram of an exemplary system that includes an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present disclosure provide a processing system having a first controller coupled with a second controller via a first communication link. The first controller may be a timing controller, and the second controller may include one or more source drivers or gate drivers for updating lines of an integrated display/sensing panel. The first controller operates to transmit display data to the second controller via the first communication link. The second controller is configured to drive one or more coupled display electrodes using the display data for performing display updating. The second controller is further configured to operate one or more coupled sensor electrodes to acquire capacitive sensing data, and to transmit the capacitive sensing data to the first controller via the first communication link.

In some embodiments, processing of acquired capacitive sensing data may occur on the second controller before transmitting to the first controller via the first communication link. In some embodiments, the first controller (e.g., a timing controller) may perform processing on received capacitive sensing data, whether processed by the second controller or unprocessed. In some embodiments, a host coupled with the first controller may perform processing on received capacitive sensing data. During exemplary operation, the first controller receives capacitive sensing data from the second controller via the first communication link, processes the capacitive sensing data, and updates the display data in response to the user input determined from the capacitive sensing data. The timing of the display updating is controlled based on high-speed data received from the host.

By distributing the processing system across multiple controllers, the costs and size of the overall processing system can be reduced. In some cases, the first controller may couple with a plurality of second controllers that drive different display electrodes within the integrated display/sensing panel. In some embodiments, the timing controller provides an embedded clock signal with the transmitted data on the first communication link, such that the first communication link supports both display updating and capacitive sensing using a minimum of three wires. For example, the first controller (e.g., a timing controller) provides a clock and data downlink that may be used for display updating, configuring capacitive sensing, and/or establishing timing for transmitting the capacitive sensing data on the uplink.

In prior approaches, the second controllers may be tuned by a display panel provider with a variety of configuration settings for performing display updating and/or capacitive sensing with that panel. Typically, such configuration settings are effectively pre-selected and "hard-wired" into the second controller. As such, these configuration settings are static and operation of the second controller is unable change during operation of the display panel (i.e., for either display updating and/or capacitive sensing).

Accordingly, in one or more embodiments, in addition to transmitting display data, the first controller may transmit configuration data to the second controllers to configure a capacitive sensing and/or display updating functionality of the second controllers. In some embodiments, the second controllers may modify their operations based on the received configuration settings in a manner that reduces power consumption by the second controllers. For example, the second controllers may dynamically modify the performance of equalizer circuitry in the second controllers by reducing equalizer bias currents. In some embodiments, the first controller may monitor an uplink from the second controllers to validate that the second controllers continue to function properly with the modified settings.

Turning now to the figures, FIG. 1 is a block diagram of an exemplary system that includes an input device 100, according to embodiments described herein. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA. Some additional examples include Embedded DisplayPort™ (eDP), MIPI®, Peripheral Component Interconnect Express® (PCIe), etc.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1. Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive. In some embodiments, the routing to capacitive sensing elements may be included on an opposite side of a dielectric (or substrate) from a sensing surface, and the controller may connect with these capacitive sensing elements using vias. In some embodiments, the controller may connect with capacitive sensing elements included on additional dielectrics.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In some embodiments, the processing system 110 (e.g., a sensing controller or timing controller component) updates the output display data directly (that is, without requiring a complete update of the display data by the associated host) based on received user input. Such embodiments may reduce latency of display updating.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and providing a touch screen interface for the associated electronic system. In another example, the sensor electrodes may be hidden from a user's view by including a black mask. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
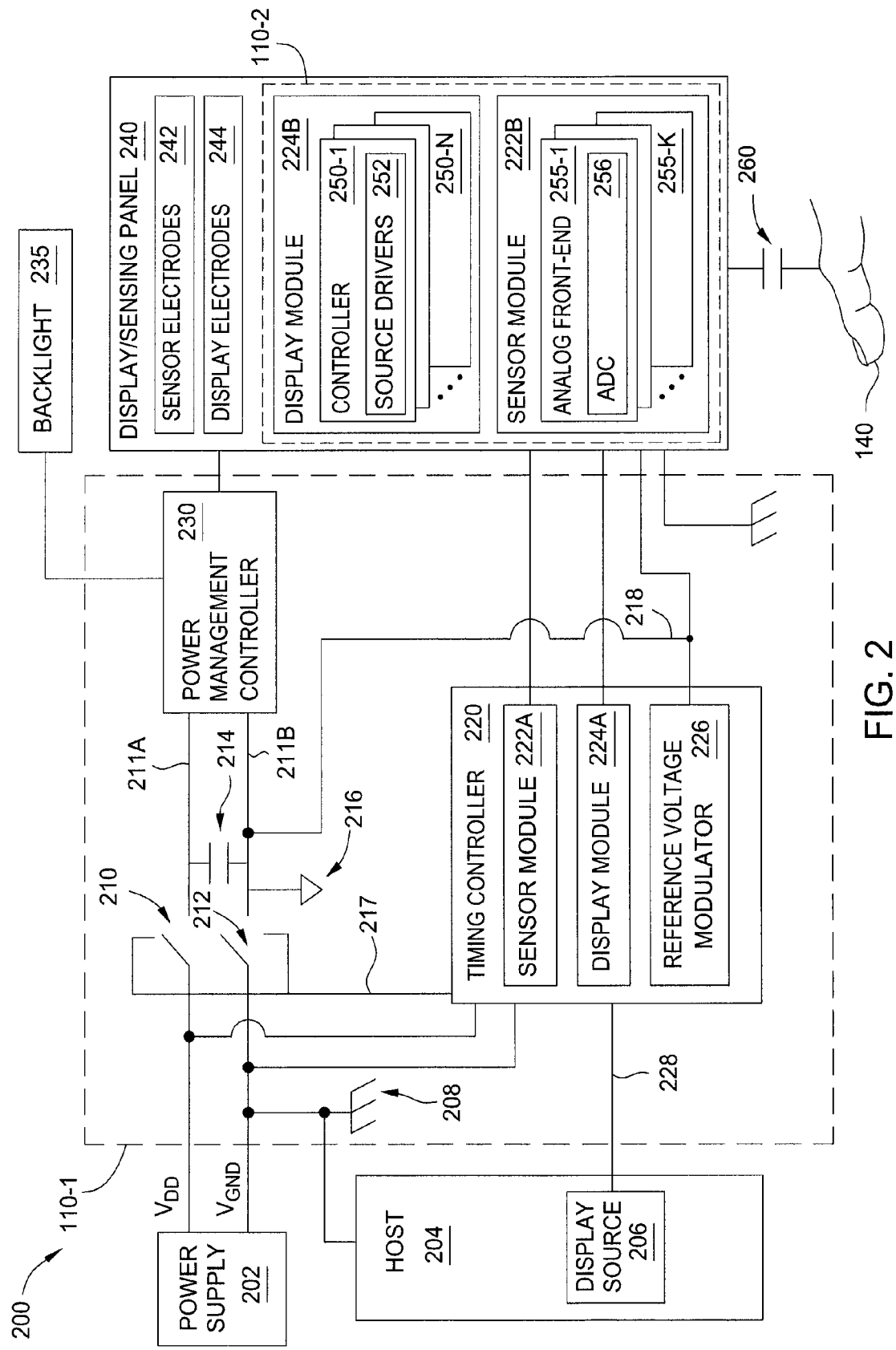
FIG. 2 is a block diagram of an exemplary input device, according to embodiments described herein.

FIG. 2 is a block diagram of an exemplary input device 200, according to embodiments described herein. The input device 200 includes a power supply 202, a host 204, processing system components 110-1 and 110-2 (collectively referred to as processing system 110), a backlight 235, and a display/sensing panel 240 (also "display panel 240"). For some display technologies (e.g., LED or OLED) the backlight 235 may not be needed. Alternately, a backlight 235 for an LCD may be powered separately using, e.g., a boost converter separate from a power management controller. In such a case, the backlight 235 may be controlled directly by the host 204 in an unmodulated voltage domain. However, the reference voltage rail modulation techniques may nonetheless be used to perform capacitive sensing. In one embodiment, the power supply 202 is a DC power source that outputs at least two reference voltages—$V_{DD}$ and $V_{GND}$—which provide power to the processing system 110 and to the display/sensing panel 240. The power supply 202 may be a battery or a power converter that is plugged into an external power source (e.g., an AC or DC electrical grid). As used herein, the low reference voltage (i.e., $V_{GND}$) is also referred to as chassis ground 208 to indicate that it is the reference voltage for the input device 200. In contrast, other power domains in the input device 200 may include local ground references (e.g., a modulated local ground 216), which may be the same voltage as chassis ground 208 or a different voltage. For example, the local ground 216 can at times be the same voltage as the chassis ground 208, but during other time periods may be modulated by being driven to different voltages. The power management controller may further supply one or more voltages relative to local ground 216, such as a Vcom voltage, "high" and "low" voltages for gate control, a "high" voltage for source control, and so forth.

In one embodiment, the host 204 represents a general system of the input device 200 that performs any number of functions such as placing phone calls, transmitting data wirelessly, executing an operating system and/or applications, and the like. The host 204 includes a display source 206 which provides updated data frames to the processing system 110. For example, the display source 206 may be a graphics processing unit (GPU) which transmits pixel or frame data to the processing system 110 in order to update a display on the display/sensing panel 240. To provide the update display data, display source 206 is coupled to the processing system 110 via a high-speed link 228 capable of transmitting data at speeds typically greater than or equal to 1 gigabit per second (Gbps). For example, the display source 206 may use Embedded DisplayPort™ (eDP) or MIPI® display interfaces to communicate display data using the high-speed link 228. In some embodiments, the high-speed link 228 is operated in an unmodulated voltage domain.

As stated above, the processing system 110 includes components 110-1, 110-2. Each of the components 110-1, 110-2 can be included in different portions of the input device 200. For example, component 110-1 may be included on a printed circuit board (PCB) of the input device 200, and component 110-2 may be included within the display panel 240, such as deposited on one or more of the glass layers. In another example, a host 204 communicates through a laptop hinge to a timing controller 220 on a PCB, which connects to display panel 240 through a flexible connector. In another example, host 204 includes the functionality of the timing controller 220 and communicates through the hinge to a capacitive sensing controller on the PCB, which connects to the display panel 240. In another example, the host communicates directly with a single IC (configured to perform capacitive sensing and display driving) in the display panel 240. In some embodiments, where multiple display voltage supplies are generated (e.g., by power management controller 230), when components or portions of the processing system 110 are included in a modulated power domain, the components or portions may be included on the flexible connection or on the PCB, but are typically not included with the host 204.

The components 110-1 and 110-2 are communicatively coupled, e.g., through flexible connectors or other conductive wiring, and the components 110-1, 110-2 together operate to perform display updating and input sensing functions for the input device 200. By separating portions of the processing system, the overall cost and size of the processing system 110 may be reduced. For example, the component 110-1 includes a significant proportion of digital logic hardware, while component 110-2 includes predominantly analog circuitry (e.g., high voltage circuitry, high precision circuitry, and/or conversion and buffering digital data circuitry). Thus, the component 110-1 may be implemented using a smaller feature size process (e.g., 55 nanometer or smaller) to reduce the size of the component 110-1. However, the component 110-2 may be implemented in a larger feature size process (e.g., 120 nm) that is better suited for driving the higher voltages associated with display updating. In some cases, the functionality of a timing controller 220 may be contained within the host 204, which may require an associated downlink (e.g., FIG. 3, elements 310) to be kept in an unmodulated voltage domain. An uplink used for providing capacitive sensing data may be modulated or unmodulated. In some embodiments, the display downlink and/or capacitive sensing uplink is modulated only during periods when the display is not being updated (e.g., during long h-blank line periods, discussed below), and not modulated while the display is updating. In this way, the uplink and downlink may be used to communicate when the display panel is operating with unmodulated voltages, and when the display panel operates with modulated voltages the uplink and downlink in some cases do not communicate.

The processing system 110-1 includes switches 210, 212, a timing controller 220, and a power management controller 230. The switches 210, 212 selectively couple reference voltage rails 211A, 211B (also reference voltage rails 211) to the power supply 202. Using control signal 217, the timing controller 220 can open and close the switches 210, 212 to thereby electrically connect and disconnect the reference voltage rails 211 with the power supply 202. Although depicted as a conductive connection, in other embodiments the reference voltage rails 211 may be capacitively or inductively coupled to the power supply 202. For inductive coupling, in some cases the control signal 217 may not be needed to disconnect the reference voltage rails (e.g., chassis ground from local ground).

When switches 210, 212 are closed, the power supply 202 charges a bypass capacitor 214. When the switches 210, 212 are open, the charge stored on the bypass capacitor 214 can be used to power the reference voltage rails 211, which are then used to power various components in the input device 200 (e.g., power management controller 230, backlight 235, or display/sensing panel 240). In one embodiment, the timing controller 220 may periodically open and close the switches 210, 212 using control signal 217 to maintain a constant, average voltage across the bypass capacitor 214 and the rails 211. Alternatively, the backlight 235 may be coupled with a separate high-current supply and is not included in a modulated voltage domain.

The timing controller 220 includes a sensor module 222A, display module 224A, and a reference voltage modulator 226. The display/sensing panel 240 includes sensor electrodes 242, display electrodes 244, and a processing system 110-2. The processing system 110-2 may comprise a sensor module 222B and/or a display module 224B having display/sensing circuitry. In one embodiment, the display module 224B includes one or more controllers 250-1 to 250-N (collectively or generically, controllers 250). Some or all of the controllers 250 include source drivers 252 and/or gate drivers (not shown) used to drive desired signals onto pixels of the display/sensing panel 240. In some embodiments, controllers 250 include separate display driver ICs and sensing ICs that are communicatively coupled. The display driver IC operates to drive the display electrodes 244, and the sensor module 222 operates to drive the sensor electrodes 242. Which ones of the display electrodes 244 and/or sensor electrodes 242 that are driven at a particular may be controlled using, e.g., a multiplexer.

The sensor and display modules 222B, 224B of processing system component 110-2 communicate with respective sensor and display modules 222A, 224A of processing system component 110-1, and together operate to provide respective capacitive sensing and display updating functions for the input device 200. Collectively, sensor modules 222A, 222B are referred to as sensor module 222, and display modules 224A, 224B are referred to as display module 224. In some embodiments, the sensor module 222B includes one or more receivers 255-1 to 255-K (collectively or generically, receiver 255) for coupling with the sensor electrodes 242. Each receiver 255 may include circuitry for conditioning the signals received on the sensor electrodes 242, such as an analog-to-digital converter (ADC) 256, other signal conditioning elements or digital logic (e.g., multiplexers), and so forth. In some embodiments, the receivers 255 may include equalizer circuitry that adjusts impedance and sample point of the signals received on the sensor electrodes

242. In some embodiments, the receivers 255 comprise an analog front-end (AFE). In some embodiments, the receivers 255 may include other hardware and/or software for processing the signals received on the sensor electrodes 242.

The sensor module 222 is coupled with elements of the display/sensing panel 240, such as the sensor electrodes 242. In some embodiments, a multiplexer or other suitable switching element(s) may be used to couple the sensor electrodes 242 with a receiver 255 (e.g., with an AFE of a receiver circuit). The switching element(s) may be included within the sensor module 222 or may be external to the sensor module 222. Using the sensor electrodes 242, the sensor module 222 performs capacitive sensing in the sensing region 120 (FIG. 1), within which the sensor electrodes 242 may be disposed. As discussed above, the sensor module 222 may use self-capacitance, mutual capacitance, or a combination of both to identify a particular location in the sensing region 120 where an input object is contacting or hovering over the input device 200. In some embodiments, instructions related to performing capacitive sensing are downloaded by the sensor module 222 from one of the host 204, a separate (Flash) memory IC, the power management controller 230, and a separate capacitive sensing IC. Downloading instructions may occur upon startup of the sensor module 222 and/or periodically.

The display module 224B includes display circuitry such as source drivers 252, gate selection logic, and gate control connections, and the display module 224B is configured to couple with display electrodes 244 (e.g., source electrodes, gate electrodes, common electrodes) for updating a display in the display panel 240. For example, based on the display data received from the display source 206, the display module 224A iterates through the rows of the display using gate electrodes, updating each of the pixels in the selected row using source electrodes. In this manner, the display module 224A can receive updated display frames from the host 204 and update (or refresh) the individual pixels in the display/sensing panel 240 accordingly.

The reference voltage modulator 226 generates a reference signal 218 that can be used to modulate reference voltage rails 211 to provide one or more modulated power domains within the input device 200. In some embodiments, the reference signal 218 may be provided to the power management controller 230 and/or the display/sensing panel 240 through conductive connections with the timing controller 220. Generally, the reference signal 218 is used to control the extent of modulation on the reference voltage rails 211. In one embodiment, the reference signal 218 is referenced with chassis ground 208. In one embodiment, the power supplies included in the modulated power domain are electrically isolated from the power supply 202 so as not to affect the voltage levels that are supplied to the input device 200, such as $V_{DD}$ and $V_{GND}$. For example, the timing controller 220 may open switches 210, 212 when reference voltage modulator 226 modulates the reference voltage rails 211 using reference signal 218. If the voltage levels of $V_{DD}$ and $V_{GND}$ were affected by the reference signal, other components of the input device 200 that rely on the voltage levels supplied by the power supply 202 may behave unpredictably or improperly. For example, the host 204 (or other components of input device 200 that are not shown) may also use the power supply 202 to power its components (e.g., the high-speed display data source). The host 204 may be designed to operate with unmodulated voltage levels, and thus, if the modulation signal were not electrically isolated from power supply 202, the modulation signal may have a negative effect on the operation of host 204, or may require extreme and/or expensive design constraints. In some embodiments, multiple display voltages are generated by the power management controller 230 in the modulated power domain.

In one embodiment, the reference signal 218 modulates the reference voltage rails 211 by increasing or decreasing the voltages on the rails in a discrete or periodic manner. In one example, the reference signal 218 causes a same or a similar voltage change on both reference voltage rails 211A and 211B such that the voltage difference between the rails 211 remains substantially constant. For example, if $V_{DD}$ is 4 volts (V) and $V_{GND}$ is 0 V, the reference signal 218 may add a ±1 V voltage swing on both rails such that voltage rail 211A changes between 5 V and 3 V, while voltage rail 211B changes between −1 V and 1 V. Nonetheless, the voltage difference between the reference voltage rails 211 (i.e., 4 V) remains the same. However, in another embodiment, the reference voltage modulator 226 may modulate only one of the voltage rails 211. For example, reference voltage rail 211A may remain constant (e.g., 3 V) while reference voltage rail 211B is modulated (e.g., between −1 V and 1 V). Moreover, the modulated reference signal 218 may be a periodic signal (e.g., a sine or square wave) or a non-periodic signal where the modulation is not performed using a repetitive signal. In some embodiments, the modulated reference signal 218 may act as a driver for performing an absolute capacitive measurement. Additionally, where both the modulated reference and an unmodulated reference (e.g., a chassis ground or VDD) are provided, the amplitude of the modulation may be used to provide a reference (e.g., amplitude, phase, and/or frequency) for the receivers 255 and/or ADC 256 that may also be demodulated and/or otherwise filtered relative to the signal.

The power management controller 230 (e.g., a power management integrated circuit (PMIC)) generates one or more voltages used for powering the display/sensing circuitry of the processing system 110-2 in the display/sensing panel 240 and/or other components of the input device 200 (e.g., backlight 235). The power management controller 230 may include a plurality of different power supplies that supply the different voltages. The power management controller 230 may be programmable. To generate the different voltages, the power supplies can be implemented as switched power supplies that use inductive boost circuits or charge pumps to change the DC voltage levels provided by the reference voltage rails into different DC voltages for operating the circuitry of the display panel 240. In some embodiments, the power management controller 230 can generate a display panel common voltage (e.g., Vcom) used by different components of the processing system 110. The power management controller 230 may also be incorporated within a chip-on-glass (e.g., COG) configuration to reduce chip count and to provide similar display panel voltages, such as gate high/low voltages (VGH, VGL), source driver high voltage (AVDD), Half-AVDD, Vcom, etc. within the modulated power domain. In some embodiments, the timing controller 220 (or capacitive sensing computing components thereof) may also be integrated into the unmodulated power domain that is also used by the host 204.

The components of the processing system 110 may be arranged in many different configurations using one or more integrated circuits (or chips). In one embodiment, the sensor module 222A, display module 224A, and reference voltage modulator 226 may be disposed on the same integrated circuit. In one embodiment, the sensor module 222A may be disposed on a different integrated circuit than the reference voltage modulator 226, e.g., combined with the display module 224A. In another embodiment, the sensor module 222A, display module 224A, and the reference voltage modulator 226 may be disposed on three separate integrated circuits. In another embodiment, the sensor module 222A and the reference voltage modulator 226 are disposed on the same integrated circuit (e.g., a Chip on Glass) while the display module 224A is disposed on a separate integrated circuit (e.g., a separate timing controller 220, or a timing controller integrated into a host IC). Furthermore, in one embodiment, the display module 224A is disposed on one integrated circuit while at least a portion of the display module 224B (e.g., a source driver 252) is disposed on a second integrated circuit, and the reference voltage modulator 226 is disposed on a third integrated circuit (e.g., the power management controller 330). In some embodiments, the power management controller 330 may also be integrated into the same IC as the source driver 252 on the display panel 240, and/or the reference voltage modulator 226 may be incorporated into the same IC as the source driver 252, even where the display module 224 is integrated onto a separate (e.g., digital) IC.

In some embodiments, some or all of the functionality of the timing controller 220 is included in the host 204. In some embodiments, the timing controller 220 and source drivers 252 may be included on the same IC, with or without the power supply. Additionally, some embodiments may include separate display driver IC(s) and sensor device IC(s), and the communication can be between sensor devices IC to the display driver IC to the host, or from the host to display driver IC and sensor device IC.

Figure 3:
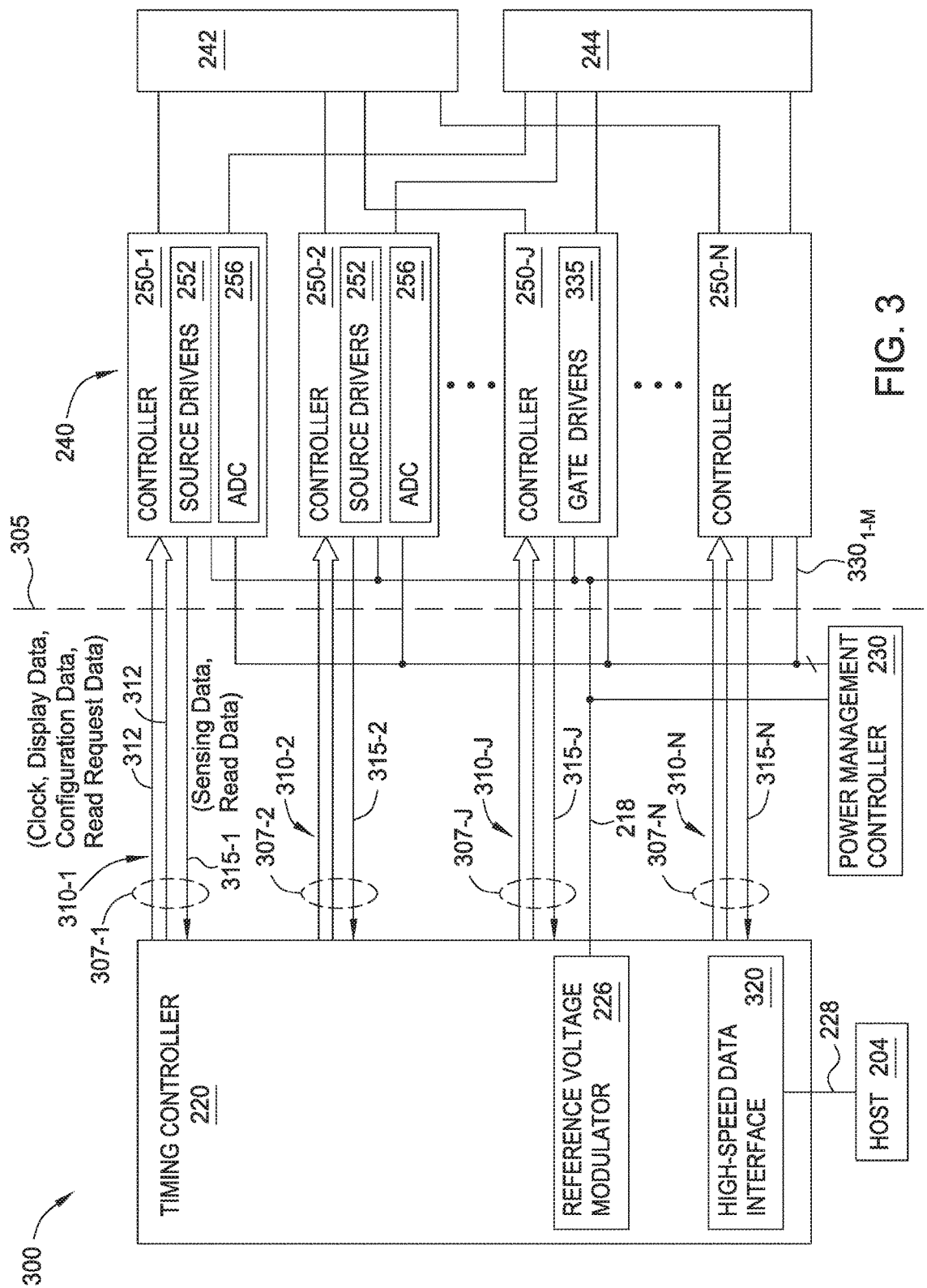
FIG. 3 is a block diagram of an exemplary processing system for an input device, according to embodiments described herein.

FIG. 3 is a block diagram of an exemplary processing system for an input device, according to embodiments described herein. Processing system 300 generally represents one possible implementation of the processing system 110 discussed above.

Processing system 300 includes timing controller 220 that is coupled with a host 204 through a high-speed data interface 320 (e.g., an eDP or MIPI interface). The host 204 transmits display data using the high-speed link 228. Timing controller 220 is communicatively coupled with a plurality of controllers 250. The controllers 250, as well as sensor electrodes 242 and display electrodes 244, are included as part of display/sensing panel 240, which is depicted as those components located to the right of the dashed line 305. The controllers 250 may include one or more source drivers 252 and/or one or more gate drivers 335 used for operating the display electrodes 244. In some embodiments, a first number of the N controllers 250 are designated for source drivers 252, and a second number of the N controllers 250 are designated as gate drivers 335.

The timing controller 220 communicates with each of the controllers 250-1 to 250-N through a respective communications link 307-1 to 307-N. Each communications link 307 comprises a respective downlink 310 and a respective uplink 315. In some embodiments, the downlink 310 and uplink 315 are in the unmodulated power domain. In some embodiments, the downlink 310 and uplink 315 are in the modulated power domain. Deep n-well ASIC isolation or multi-chip module isolation techniques may be used for the timing controller 220 and/or controllers 250 when in the modulated power domain.

Each downlink 310 includes at least two wires 312 and is configured to carry data and an embedded clock signal transmitted by the timing controller 220 to the respective controller 250. In some embodiments, the embedded clock signal is used to interpret and control the output of display data. In some embodiments, the embedded clock signal is also used to control the timing for operating capacitive sensing circuitry and/or the timing of uplink data. The data includes display data received by the timing controller 220 at the high-speed data interface 320

In one or more embodiments, the data carried by a downlink 310 of a communication link 307 may include an operating parameter for the controller 250, specifically for the source driver 252. The timing controller 220 may transmit the operating parameter, which the controller 250 uses to modify capacitive sensing operation and reduces power consumption of the controller 250. In one embodiment, the timing controller 220 transmits an equalizer bias setting, which the controller 250 uses to reduce power consumption of equalizer circuitry within the source driver 252. Other types of configuration settings or data may be included in the downlink 310 to cause changes in operation of the controller 250.

Each uplink 315 includes at least one wire and is configured to carry data transmitted by the controller 250 to the timing controller 220. In some embodiments, the uplink 315 may be used to report sensing data acquired by sensor electrodes 242, which can be converted to a digital signal using an ADC. In some embodiments, controllers 250 may transmit register read data using the uplink 315.

In one or more embodiments, controllers 250 may transmit a status indication via the uplink 315 to the timing controller 220, which the timing controller 220 uses to monitor the capacitive sensing operation. The timing controller 220 may use the status indication as feedback for changes to the operating parameter (that is provided via the downlink 310). For example, the timing controller 220 may raise an operating parameter (e.g., equalizer bias setting) until the status indication reports proper capacitive sensing operation from the controllers 250. In one implementation, the status indication is logically OR'ed across the plurality of controllers 250.

The power management controller 230 may be connected with each of the controllers 250, providing power signals $330_{1-M}$ at different voltage levels, such as a Vcom and one or more analog and/or digital voltage levels. In one embodiment, the voltage supply outputs from the power management controller 230 may be included on the panel side or on a PCB (that is, on the host side of the display flex connection) but are still included in the isolated or modulated power domain. As discussed above, the power signals $330_{1-M}$ generated by the power management controller 230 may be modulated based on a reference signal 218 from the timing controller 220. In some embodiments, the power signals $330_{1-M}$ are modulated during capacitive sensing periods that do not overlap with low power duty cycle modes, interference measurements, etc.

During operation of the processing system 300, timing controller 220 configures the sensing registers of the controller 250 using the downlink 310, and the uplink 315 is used to report sensing data acquired from the ADCs of the controller 250 and/or register data from the controllers 250. The timing controller 220 can specify certain register location(s) to be read, and the controller 250 reports values of those registers back to the timing controller 220 using the uplink 315. The data in the register may include sensing data or other types of data.

In some embodiments, data read from registers of the controllers 250 may be used for other purposes. For example, register data can be used to perform error detection and/or correction, such as a cyclic redundancy check (CRC) or any other suitable techniques. The register data can also be used for testing the operation of controllers 250 and/or for performing scrambling techniques, such as spread-spectrum techniques used to minimize radiated power from the processing system 300.

In some embodiments, the processing system 300 is also configured to perform interference detection at times using the sensor electrodes 242. An active input device, such as an active pen, generally emits a signal that is coupled with the sensor electrodes 242 to provide input to the processing system 300. During times of interference detection, the timing controller 220 need not perform modulation as the modulated signal is provided by the source of interference (e.g., the active pen).

Because the clock signal is embedded with data transmission from the timing controller 220, a single clock signal may be used for the downlink 310; the clock signal is recoverable at the controllers 250 by applying the received data to a delay-locked loop. The data transmitted on downlink 310 drives display data and/or configures sensing data, and can also regulate the timing of when the display data is displayed and when the sensing data is acquired. The timing aspect or configuration of a line of the downlink data can also control whether a particular line is configured as a display line or a blanking line such as a horizontal blank line (h-blank), a long h-blank line that exceeds one line update time period, etc. The clock signal contained in the downlink 310 is further configured to regulate the speed of the uplink 315, so that a separate clock is not required to perform display operation, sensing operation, and uplink clocking. The timing controller 220 thus receives a signal at an expected speed on the uplink 315, though the received signal may exhibit a phase delay that may be corrected through appropriate tuning. Therefore, the processing system 300 may operate both input sensing and display updating functions using only three wires. Other configurations including more wires may be possible, but each additional wire generally adds to the complexity and costs of processing system 300. For example, to include another connection between each controller 250 and the timing controller 220 requires a number of wires corresponding to the several controllers 250, as well as routing the connections through various layers and connectors of the input device, such as through flexible connectors, conductive pads, routing through glass or other display layers, and so forth.

In alternative embodiments, other timing sources may be used. In cases where a delay-locked loop is used, a ring oscillator can be locked to the clock signal. Other timing sources may include RC-based oscillators or other timing methods that provide time-outs for resetting, error recovery, or debugging communication channels. In particular, other serial connections may be self-timed (e.g., I2C or SPI) to allow testing, sequencing, or alternate control of the sensor module 222 independent from the display module 224. Separate connections can be made for this purpose at higher cost and complexity.

During operation of the processing system 300, there may be times during which the timing controller 220 is not transmitting display data on the downlink 310 for display updating. During these times, the processing system 300 may, e.g., be performing sensing measurements using the controllers 250, performing conversions of the sensing measurements using the ADCs, sending sensing configuration data through the downlink, or sending data to the timing controller 220 through the uplink 315. Although no display updating is occurring, the timing controller 220 may still continue to transmit a clock signal using downlink 310, even if no sensing configuration data or display data is included therewith. In some embodiments, the transmitted clock signal is a word clock. In other embodiments, the transmitted clock signal is a line clock. The source drivers 252 and/or gate drivers 335 on various controllers 250 receive the transmitted clock signal. In some embodiments, during extended periods without receiving a display data line configuration, or without receiving a downlink clock, the source driver may enter a low power mode (e.g., timed by a separate oscillator) and/or a special clock recovery mode that allows rapid (e.g., within about the time of one display line) delay-locked loop clock recovery when the display embedded clock data resumes (e.g., after an extended vertical blanking time with a low refresh rate, such as less than 48 Hz).

For some differential signaling protocols (such as I2C), sensing data may be transmitted on the uplink 315 when the two wires 312 of the downlink 310 are not being modulated relative to each other. For example, in I2C, when both the serial data and the serial clock lines are in the same state (whether high or low), the signal is not considered a valid data signal.

The depicted configuration of processing system 300 can provide additional benefits. For example, when the processing system 300 is first powered on, the timing controller 220 may need to determine whether the source drivers 252 of controllers 250 are receiving the transmitted data. The display data is sent at a relatively high rate (e.g., 1 Gbps or higher), but some substantial amount of time is often required before the delay-locked loop is able to synchronize with the embedded clock of the downlink 310. During that time, the processing system 300 cannot count on the display data or acquired sensing data as being reliable. In some embodiments, the timing controller 220 transmits a relative simple data signal on the downlink 310 (such as a clock signal without accompanying display or touch data) until the timing controller 220 receives a "lock" signal from the controllers 250 indicating synchronization with the clock signal has been achieved. Generally, sending the clock signal by itself may be easier for the delay-locked loop to acquire.

In one configuration, a clock "lock" signal could be implemented using a separate wire connected with the timing controller 220 and daisy-chained with each controller 250 in sequence before returning to the timing controller 220. Responsive to an initial signal from the timing controller 220, each controller 250 sequentially indicates when a lock has been achieved. When the lock is acquired on the last controller 250, a signal is sent from the last controller 250 to timing controller 220, which indicates that all controllers have locked. However, this configuration may result in extra cost and/or complexity in routing additional connections between the different controllers 250 and timing controller 220. Additionally, it may be difficult to diagnose which of the controllers 250 cannot achieve a lock, as the only feedback to the timing controller 220 is the signal from the last controller 250. In some embodiments, the uplink 315 can instead be used to send the clock lock signal. If at start-up, the uplink 315 of a particular controller 250 remains in a particular state (whether low or high states, a high-impedance state, etc.) or otherwise fails to transmit a lock signal during an expected time period, the timing controller 220 may assume that the particular controller 250 does not have a lock. The timing controller 220 may further be configured to adjust tuning parameters with each of the controllers 250 (such as by pre-emphasizing signals) to improve a signal-to-noise ratio (SNR) or other performance metric for the particular communications link 307.

The timing controller 220 at times may wish to reset the controllers 250. Like the first clock lock signal implementation, a configuration might include a daisy-chained link across each of the controllers 250 using an extra wire. The timing controller 220 raises the link to reset the controllers 250 and should ultimately receive back a raised line from the last controller 250 of the sequence.

In some embodiments, a reset signal can be sent by the timing controller 220 by adjusting the voltage(s) of the downlink 310. For example, if both differential inputs of downlink 310 are driven to a high state or a low state—which could correspond to an invalid input state—the controllers 250 can be reset using just the downlink 310. An acknowledgement of the reset can be detected by the timing controller 220, e.g., by measuring a voltage on the uplinks 315 for the controllers 250. Such a reset signal may also place the controllers on the panel in a low power or rapid clock recovery state (e.g., lowering buffer bias currents, turning off unneeded circuitry, reducing other oscillator frequencies, etc.).

Figure 4:
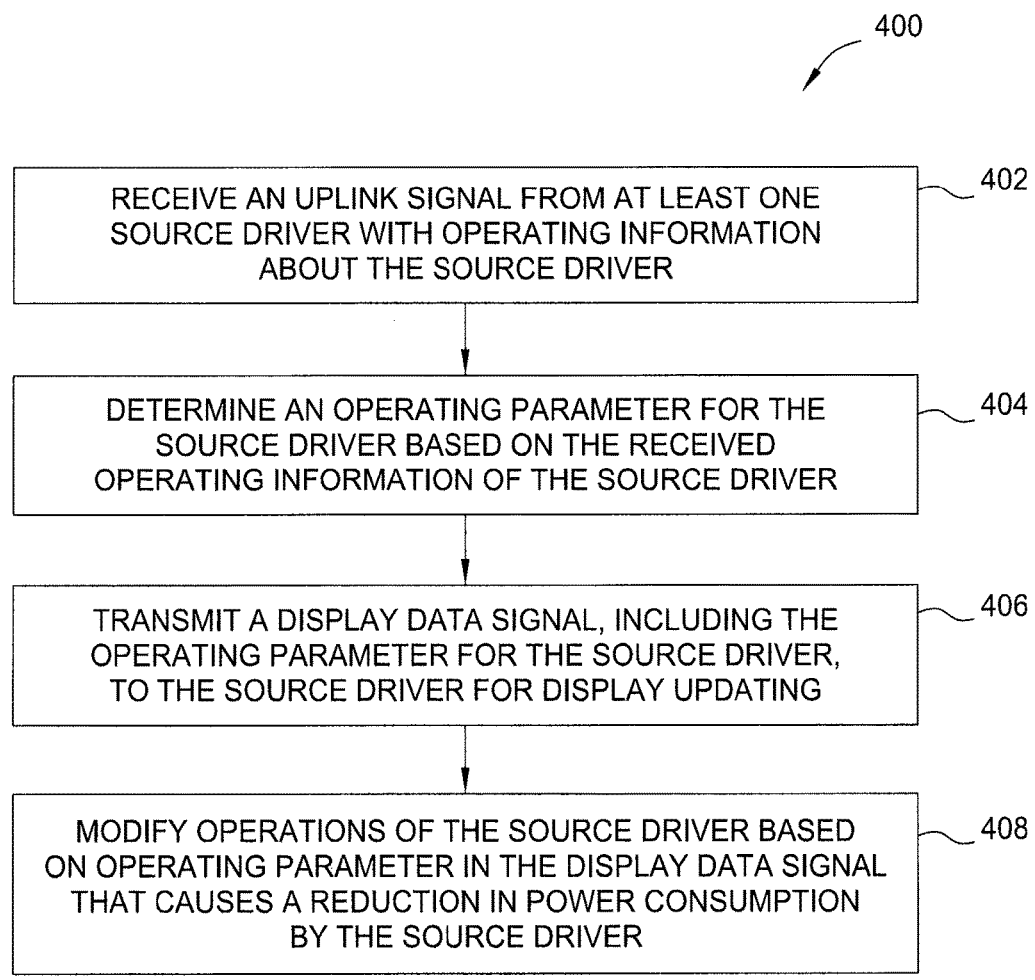
FIG. 4 is a flow diagram depicting a method for modifying operations of a distributed processing system for an integrated display sensing device, according to embodiments described herein.

FIG. 4 is a flow diagram depicting a method 400 for modifying operations of a distributed processing system for an integrated display sensing device, according to embodiments described herein.

At block 402, a timing module receives an uplink signal from at least one controller 250 with operation information about the second controller. In some embodiments, the at least one controller 250 is coupled to a plurality of common electrodes of a display panel 240. In some embodiments, the at least one controller 250 is further configured to be coupled to a plurality of sensor electrodes (e.g., sensor electrodes 242) that each comprise at least one of the plurality of common electrodes, and the controller 250 is configured to perform input sensing.

In some embodiments, the timing module may be a separate, stand-alone hardware module or application-specific integrated circuit (ASIC), such as the timing controller 220. In other embodiments, the timing module may be integrated as a hardware module part of another controller, such as the host 204. While present embodiments are described using the terms "timing controller" or "first controller", it is understood that the described embodiments may be implemented with and utilized by different configurations of integrated and/or separate hardware modules.

At block 404, the timing module determines an operating parameter for the controller 250 based on the received operating information of the controller 250. In some embodiments, the timing module determines the operating parameter based on a resolution of the display and speed of a communication channel between the timing module and the controller 250. In some embodiments, the timing module determines the operating parameter further based on configuration data provided by an external controller, such as the host 204.

In cases where the operating parameter is an equalizer bias setting, the timing module may determine the equalizer's power requirements based on a sensing resolution of the display and based on a channel model between the timing module and the controller 250. The sensing resolution of the display relates to the amount of sensing data (e.g., payload), and hence the data rate, that will be transmitted from the controller 250 to the timing module (via the downlink 310). Responsive to determining that the data rate is relatively low and/or the channel is "clean" (i.e., no aggressors and lossless), the timing module may determine a reduced equalizer bias setting for the controller 250. In some implementations, the value of the equalizer bias setting may be expressed in absolute terms, or in relative terms, such as percentages of a full power setting (e.g., 100%, 80%, 60%, 40%, etc.).

At block 406, the timing module transmits a display data signal to controller 250, via the downlink 310 of the communication link 307, for display updating. The display data signal includes the determined operating parameter for the controller 250. In some embodiments, the value of the operating parameter may be encoded as a multi-bit field contained within the display data signal.

At block 408, the controller 250 modifies operations based on the operating parameter in the display data signal, which causes a reduction in power consumption by the controller 250. In some embodiments, the controller 250 operates equalizer circuitry in the receivers 255 using a modified equalizer bias setting. For example, the controller 250 may modify the receiver equalizer bias currents (e.g., to 80%, 60%, 40% of a default power setting) that causes a lower power consumption by the controller 250.

In some embodiments, the operating information received from the controller 250 may result in the timing module determining an increase in an operating parameter. For example, the operating information received from the controller 250 may be status data indicating whether proper capacitive sensing and/or display updating operations are being performed by the controller 250. Responsive to receiving status data indicating that the controller 250 is not properly performing capacitive sensing operations, the timing module may determine an increase to the equalizer bias setting that boosts operation of the equalizer circuitry contained within the controller 250.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A processing system for a display, the processing system comprising:
at least one source driver configured to be coupled to a plurality of common electrodes of the display and configured to drive the plurality of common electrodes for display updating; and
a timing controller coupled to the at least one source driver via a communication link, the timing controller configured to:
receive, via the communication link, an uplink signal including operating information of the at least one source driver;
determine an equalizer bias setting for the at least one source driver based on the received operating information;
transmit, via the communication link, a display data signal to the at least one source driver, the display data signal including timing control information and the determined equalizer bias setting for the at least one source driver; and
reduce power consumption of the at least one source driver by causing a modification of sensing operations of the display based on the determined equalizer bias setting.

2. The processing system of claim 1, wherein the timing controller is further configured to:
   determine the equalizer bias setting based on at least one of a resolution of the display or a speed of the communication link between the timing controller and the at least one source driver.

3. The processing system of claim 1, wherein the at least one source driver is configured to:
   perform input sensing using one or more sensor electrodes associated with the plurality of common electrodes.

4. The processing system of claim 1, wherein the at least one source driver is configured to switch to a low power state based on a reset signal indicated by the timing controller.

5. The processing system of claim 4, wherein the reset signal comprises an invalid input state provided on the communication link between the timing controller and the at least one source driver.

6. The processing system of claim 1, wherein the operating information of the at least one source driver comprises a status indication of the at least one source driver.

7. The processing system of claim 6, wherein the timing controller is further configured to:
   increase the equalizer bias setting based on the status indication indicating that the at least one source driver is performing improperly.

8. The processing system of claim 1, wherein the at least one source driver is configured to enter a rapid clock recovery state based on a reset signal indicated by the timing controller.

9. A display device, comprising:
   a plurality of common electrodes;
   at least one source driver coupled to the plurality of common electrodes and configured to drive the plurality of common electrodes for display updating;
   a timing controller coupled to the at least one source driver via a communication link, the timing controller configured to:
      receive, via the communication link, an uplink signal including operating information of the at least one source driver;
      determine an equalizer bias setting for the at least one source driver based on the received operating information of the at least one source driver; and
      transmit, via the communication link, a display data signal to the at least one source driver, the display data signal including timing control information and the determined equalizer bias setting for the at least one source driver;
   wherein the at least one source driver is configured to reduce its power consumption based on the determined equalizer bias setting.

10. The display device of claim 9, wherein the timing controller is further configured to:
    determine the equalizer bias setting based on at least one of a resolution of the display or a speed of the communication link between the timing controller and the at least one source driver.

11. The display device of claim 9, wherein the at least one source driver is further configured to:
    perform input sensing using one or more sensor electrodes associated with the plurality of common electrodes.

12. The display device of claim 9, wherein the at least one source driver is further configured to switch to a low power state based on a reset signal indicated by the timing controller.

13. The display device of claim 9, wherein the operating information of the at least one source driver comprises a status indication of the at least one source driver.

14. The display device of claim 13, wherein the timing controller is further configured to:
    increase the equalizer bias setting based on the status indication indicating that the at least one source driver is performing improperly.

15. A method for operating a source driver of a display device, the method comprising:
    receiving, from the source driver via a communication link, an uplink signal including operating information of the source driver;
    determining an equalizer bias setting for the source driver based on the received operating information;
    transmitting, to the source driver via the communication link, a display data signal including timing control information and the determined equalizer bias setting; and
    reducing power consumption of the source driver by causing a modification of sensing operations of the display device based on the determined equalizer bias setting.

16. The method of claim 15, wherein the equalizer bias setting is based on at least one of a resolution of the display device or a speed of the communication link between the timing controller and the source driver.

17. The method of claim 15, further comprising:
    generating a reset signal based on an invalid input provided on the communication link; and
    switching the source driver to a low power state based on the reset signal.

18. The method of claim 15, further comprising:
    increasing the equalizer bias setting based on a status indication reporting that the source driver is performing improperly.

19. A non-transitory computer-readable medium comprising instructions that, when executed by a processor of a system including at least a source driver coupled to a display device, causes the system to reduce power consumption of the source driver by performing operating comprising:
    receiving, via a communication link, an uplink signal including operating information of the source driver;
    determining an equalizer bias setting for the source driver based on the received operating information;
    transmitting, to the source driver via the communication link, a display data signal including timing control information and the determined equalizer bias setting; and
    modifying sensing operations of the display device based on the determined equalizer bias setting.

20. The non-transitory computer-readable medium of claim 19, wherein execution of the instructions causes the system to perform operations further comprising:
    generating a reset signal based on an invalid input provided on the communication link; and
    switching the source driver to a low power state based on the reset signal.

* * * * *